UNITED STATES PATENT OFFICE.

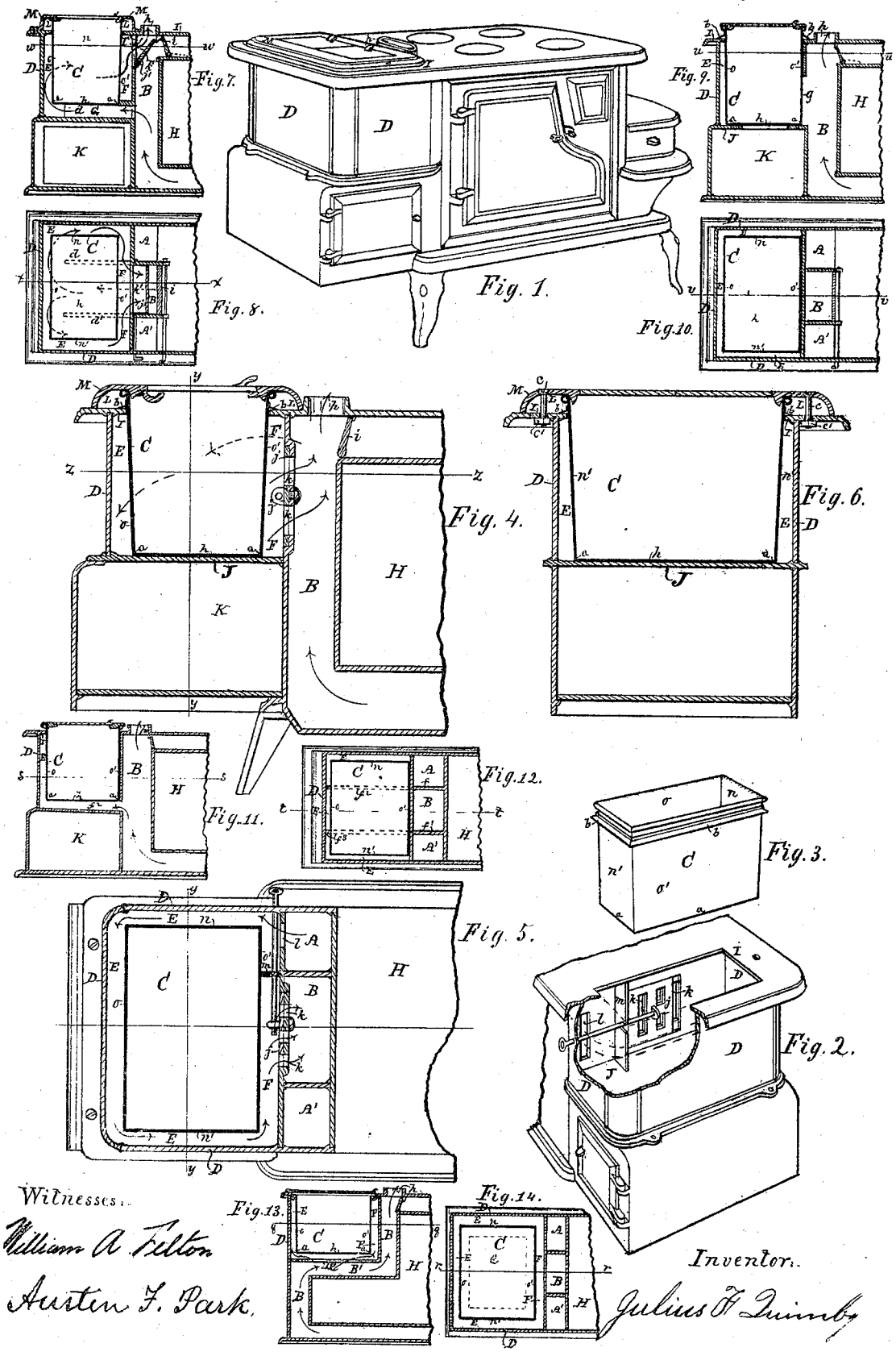

JULIUS F. QUIMBY, OF TROY, NEW YORK, ASSIGNOR TO SWETT, QUIMBY & PERRY, OF SAME PLACE.

IMPROVEMENT IN COOKING-STOVES.

Specification forming part of Letters Patent No. 128,655, dated July 2, 1872.

Be it known that I, JULIUS F. QUIMBY, of the city of Troy, in the county of Rensselaer and State of New York, have invented certain Improvements in Cooking-Stoves, of which the following is a specification, reference being had to the accompanying drawing.

My invention relates to cooking-stoves which have reservoirs for holding and heating water. One part of my invention consists in the combination, with a cast-iron cooking-stove, of a water-reservoir formed of sheet-copper tinned on the inner surface, or other suitable sheet metal which is a better conductor of heat and less easily oxidized by water than cast-iron, and arranged at one end of the stove, and constituting a part of the casing of a flue or space for the heated gases of combustion, when the lower and main portion, or the whole of the outer side and ends of the reservoir, is surrounded by an outside cast-iron casing, which is not fitted closely to the said sheet-metal reservoir, but is separated therefrom by an inclosed non-conducting space or spaces, substantially as hereinafter described. Another part consists in the combination, with a cast-iron cooking-stove, of a water-reservoir formed of sheet-metal, and arranged at one end of the stove in a hot gas-chamber having a lateral outside casing of cast-iron, when the bottom of said reservoir rests on a suitable support or supports, and the sides and ends of the reservoir project through and above the top of said hot gas-chamber in the same or nearly the same planes or directions that they extend below that top, or without any lateral shoulder on the reservoir to suspend the latter from the top of said chamber, substantially as hereinafter set forth. Another part consists in the combination, with a cast-iron cooking-stove, of a sheet-metal water-reservoir, supported at its bottom in a chamber having a cast-iron casing for the heated gases of combustion in one end of the stove when the said water-reservoir extends through and above the top of said chamber, and has a thin sheet-metal elastic or yielding strip or flange secured to and around the sides and ends of the reservoir, and projecting laterally therefrom, above and in contact with the upper surface of the top of said gas-chamber, substantially as hereinafter described. Another part consists in the combination, with a cast-iron cooking-stove, of a sheet-metal water-reservoir having its lower and main position in a heating-chamber which has a cast-iron casing at one end of the stove, and is open to a flue or flues for the heated gases of combustion, when the upper part of said sheet-metal reservoir is surrounded by a warm-air chamber, which has a removable cast-iron casing or cover, substantially as hereinafter set forth.

In the aforesaid drawing, Figure 1 is a perspective view of a cast-iron cooking-stove which embodies the distinguishing features of my invention. Fig. 2 is a perspective view of a part of the rear portion of the same stove when the water-reservoir is removed; and Fig. 3 is a perspective view of the reservoir of that stove. Fig. 4 is a central vertical section of the rear part of a "three-flue" cast-iron cooking-stove in which my invention is embodied. Fig. 5 is a horizontal section of the same stove at the line $z\ z$, and Fig. 6 is a vertical transverse section at the line $y\ y$. Figs. 7 and 8, 9 and 10, 11 and 12, and 13 and 14 are vertical and horizontal sections of the rear parts of four "three-flue" cast-iron cooking-stoves, of which each embodies one or more of the aforesaid parts of my invention. Fig. 7 is a section of Fig. 8 at the line $x\ x$; and Fig. 8 is a section of Fig. 7 at the line $w\ w$. Fig. 9 is a section of Fig. 10 at $v\ v$; and Fig. 10 is a section of Fig. 9 at $u\ u$. Fig. 11 is a section of Fig. 12 at $t\ t$; and Fig. 12 is a section of Fig. 11 at $s\ s$. Fig. 13 is a section of Fig. 14 at $r\ r$; and Fig. 14 is a section of Fig. 13 at $q\ q$.

Like parts are marked by like letters in the different figures, and the arrows therein indicate the directions in which the heated gases of combustion may circulate.

A A' are descending flues, and B is an ascending one, for the gases of combustion, in rear of the oven H; and $p$ is the exit-passage. C is a water-reservoir, constructed of sheet-copper tinned on the inner surface; or it may be made of any suitable sheet-metal which is a better conductor of heat and less easily oxidized by water than cast-iron. In each stove represented in the drawing the lower and main portion of the outer side $o$ and ends $n\ n'$ of the reservoir is covered by a cast-iron casing, D, which is not fitted closely against or in contact with the outer side and ends of the reservoir, but is separated therefrom by an inclosed space, E; and the sheet-metal reservoir C in each stove forms a part of the casing of a flue, space, or chamber for, and is directly exposed to, the heated gases from the combustion of fuel in the stove.

In the stoves represented by Figs. 2, 3, 4, 5, and 6, the lower and main portion of the sides o o' and ends n n' of the reservoir are exposed to the heated gases by forming the inner casing of the flue-space E F, which has a partition, m, Fig. 5, and is at one end in communication with the flue A by an aperture, l, and at the other end with the flue B by apertures k, furnished with a damper or register, j; consequently, when the direct-draught damper i, Fig. 4, is closed, and the damper j is open, as in Figs. 2, 4, and 5, the heated gases of combustion will pass from the flue A through the aperture l into and through the space E F around the reservoir, and thence through the apertures k into the ascending flue B; and when the apertures k are closed by the damper j the space E F is a dead chamber, into which the heated gases may enter from the flue A and thereby warm or heat the reservoir.

In Figs. 7 and 8 the bottom h of the reservoir C is the top casing of a flue-space, G, under the reservoir, and the sides and ends of the reservoir form the inner casing of the flue-space E F which surrounds the reservoir, and has communication at the bottom with the space G, which is open to the flue B, and at the top with the exit-passage p by a passage, k', furnished with a damper, j'. When the direct-draught damper i, Fig. 7, is closed and the damper j' is open, as shown in that figure, the gases of combustion must pass from the flue B, through the space G, into and through the flue-space E F, and thence through the passage k' into the exit-aperture p; and when the passage k' is closed by the damper j' the spaces G E F form a dead-chamber, into which the heated gases may pass from the flue B.

In the stoves represented in part by Figs. 9 and 10, the hot gases of combustion in the flue B or flues A A' B are in direct contact with a part of the front side of the sheet-metal reservoir C, as indicated at g in Fig. 9; and the space E, between the cast-iron casing D and the rear side o and ends n n' of the reservoir, is either a dead-air chamber or has openings into the descending gas-flues A A'.

In Figs. 11 and 12 the flues A A' and B are extended under the bottom of the sheet-metal reservoir C and into the space E, and the flue-strips $f f^1$, which separate the flues B and A A', are extended under the bottom and up across the rear side o of the reservoir through the space or chamber E, so that the gases of combustion will expand or pass from the flue B against the middle parts of the bottom h and rear side o of the reservoir, and from the flues A and A' against the end portions of the bottom and rear side, and in contact with the ends n n' of the same.

In Figs. 13 and 14 the space or chamber E F is extended under the bottom of the sheet-metal reservoir C, with a large opening, e, into a horizontal part, B', of the flue B, so that the gases of combustion will rise from the part B' of the flue B into contact with the bottom, sides, and ends of the reservoir C, and thereby heat the latter.

In Fig. 13 the removable reservoir C is suspended and sustained in the hot gas-chamber E F wholly by means of a wired rim turned on the upper edge of the reservoir, and resting in a depression in the top of said chamber, along the edge of the opening through which the reservoir is inserted. In that case the whole weight of all the water in the reservoir, and the occasional downward strain caused by suddenly pouring in large quantities of water, must be sustained by the top of the heating-chamber E F, and by the rim on the top edge of the reservoir, and by the thin sheet-copper or other sheet metal of the upright sides and ends of the reservoir, and by the seam at the angles a, where the sides and ends are joined to the bottom; and the great weight and strain are liable or tend to bend open and break the joints at the angles a, and to rupture the thin sides and ends of the reservoir, especially where the generally-unfilled upper portion of the sheet-metal reservoir is highly heated by the hot gases of combustion, in the chamber E F in Fig. 13.

These defects are all avoided in the stoves represented by Figs. 4, 6, 7, 9, and 11, wherein the bottom h of the sheet-metal reservoir rests on a suitable support or supports, and the sides o o' and ends n n' project up through and above the top plate I of the heating-chamber E or E F in the same or nearly the same planes or directions that they extend below that top plate, without any shoulders to support the reservoir on the top of the heating-chamber, so that while the uppermost portion of the sheet-metal reservoir, which is generally not filled with water, shall not be exposed to the heated gases in the chamber E or E F, the weight of the water in the reservoir shall not be supported by the top of the heating-chamber, nor by downward strain on the upright sides and ends of the reservoir, nor by the seam by which the sides and ends of the reservoir may be joined to its bottom; but shall at all times be sustained by the support or supports immediately under and against the bottom of the reservoir, however much more or less the sides and ends of the sheet-copper or other sheet-metal reservoir shall expand and contract than the cast-iron casing D.

In Figs. 7 and 8 the bottom of the reservoir C is supported by the flue-strips $d d'$, and in Figs. 11 and 12 by the flue-strips $f^2 f^3$. In Figs. 2, 4, 5, 6, 9, and 10 the bottom of the reservoir C rests upon and is supported by the bottom J of the heating-chamber E or E F. In Figs. 9 and 10 the middle portion of the bottom h of the reservoir forms a part of the top of the warming-closet K.

In Figs. 3, 4, 6, and 9 $b$ is a thin sheet-metal elastic or flexible strip or flange soldered or fastened to and projecting laterally from the sides and ends of the reservoir C, so as to bear or rest gently upon the upper surface of the cast-iron top I of the chamber E or E F, when the bottom $h$ of the reservoir rests on the support J, and thus form a yielding close cover over the narrow space or crevice between the reservoir and the edge of the opening in the top I, and thereby prevent the passage therethrough of hot gases from or cold air into the heating-chamber E or E F, when the reservoir shall be loose in the top I, and however much more the sheet-metal reservoir may expand or contract than the cast-iron casing D.

In Figs. 4, 6, and 7, L is an inclosed air-chamber, having a removable cast-iron casing or cover, M, around that part of the removable sheet-metal reservoir C which is above the level of the top plate I of the hot gas-chamber E F; so that, while the whole of the reservoir is thoroughly protected on the outside by the cast-iron casings D and M, and is secured in place in the stove by the part M, and the lower and main portion of the reservoir, which is generally filled with water, is exposed to the direct action of the hot gases of combustion in the chamber E F, the upper portion of the reservoir, which is commonly empty, will be kept warm or hot by the hot-air chamber L, without being liable to be thereby burned out or overheated.

In Fig. 6, $c$ $c'$ are removable screw-bolts and nuts, by which the cover M is secured to the top plate I; and on removing these nuts and bolts the cover M and reservoir C may be readily removed from the stove.

I am aware that it has been proposed to make a cooking-stove with a sheet-copper or other sheet-metal water-reservoir, placed in the rear end of the stove, and, in part, exposed directly to the heated gases of combustion therein, and covered on its rear side and ends by a jacket of cast-iron, which, in all its parts, was to fit closely around and in contact with the reservoir. I also know that it is not new to construct a cast-iron cooking-stove with a cast-iron reservoir, galvanized or coated with zinc or an alloy of zinc and tin, or enameled internally, and arranged in the rear part of the stove, and surrounded on its outer side and ends by a cast-iron casing and an intermediate flue or space for the heated gases of combustion. I am also aware that small models of cooking-stoves have been made with a water-reservoir of sheet-metal arranged in the rear end thereof, and forming a part of the casing of a flue or space for the gases of combustion, and with the outer side and ends of the reservoir surrounded by a sheet-metal casing, which was separated from the reservoir by an intervening inclosed space.

I do not, however, know or believe that a cast-iron cooking-stove was ever made or devised before my invention with a sheet-metal water-reservoir arranged in one end of the stove, and forming a part of the casing of a flue, space, or chamber, for the gases of combustion, and surrounded on its outer side and ends by a cast-iron casing, separated from the reservoir by an inclosed space or spaces, in any manner substantially as hereinbefore described, so that the sheet-metal reservoir shall be far better protected by the rigid cast-iron casing from being bruised, broken, or injured from the outside in shipping, transporting, or using the combined stove and reservoir than if the latter was surrounded by a sheet-tin or other sheet-metal casing; and so that water will be heated faster and hotter in the sheet-metal reservoir than if the reservoir consisted of cast-iron, either naked, coated, galvanized, or enameled; and so that the inclosed space or spaces between the outside cast-iron casing and the outer side and ends of the sheet-metal reservoir will cause the water to be heated faster and hotter, and to cool slower, than if the outer side and ends of the sheet-metal reservoir were covered by a cast-iron jacket, fitted in every part in close contact with the reservoir.

What I claim as new and of my invention is—

1. A cast-iron cooking-stove having the sheet-metal water-reservoir C arranged in one end of the stove, and forming a part of the casing of a flue or space for the heated gases of combustion, and surrounded on its outer side and ends by a cast-iron casing, D, which is separated from the reservoir by the inclosed space or spaces E, as described.

2. In a cast-iron cooking-stove, the sheet-metal water-reservoir C, arranged at one end of the stove in the hot-gas chamber E or E F, having the cast-iron casing D, when the said reservoir is sustained by the support or supports under its bottom $h$, and the sides $o$ $o'$ and ends $n$ $n'$ of the reservoir project through and above the top plate I of the gas-chamber in the same, or nearly the same, planes that they extend below that top plate, as herein set forth.

3. In a cast-iron cooking-stove, the sheet-metal water-reservoir C, supported at its bottom in the hot-gas chamber E or E F, and extended through and above the top I thereof, when a sheet-metal, elastic, or yielding flange, $b$, is secured to and around the reservoir, and projects therefrom above and against the upper surface of the said top of the gas-chamber, as described.

4. In a cast-iron cooking-stove, a sheet-metal water-reservoir, C, having its lower and main portion in a heating-chamber, E or E F, which has a cast-iron casing, D, and is open to the flue or flues for the gases of combustion, when the upper part of said reservoir is in a hot-air space or chamber, L, which has a removable cast-iron casing or cover, M, substantially as described.

JULIUS F. QUIMBY.

Witnesses:
WILLIAM A. FELTON,
AUSTIN F. PARK.